FIG. 1

INVENTORS
Gail T. Litton
Edwin G. Hoefs
BY
W. R. Robertson
AGENT

INVENTORS
Gail T. Litton
Edwin G. Hoefs

INVENTORS
Gail T. Litton
Edwin G. Hoefs
BY
W. R. Robertson
AGENT

United States Patent Office 2,992,417
Patented July 11, 1961

2,992,417
AUTOMATIC BALANCE-SENSITIVITY-LINEARITY CORRECTING UNIT FOR USE WITH DATA RECORDING AND TELEMETERING SYSTEM
Edwin G. Hoefs and Gail T. Litton, Dallas, Tex., assignors to Chance Vought Corporation, a corporation of Delaware
Filed July 11, 1955, Ser. No. 521,038
13 Claims. (Cl. 340—207)

The present invention relates to an improved telemetering and automatic data reduction facility. More specifically, our invention pertains to a correcting unit or mechanism for automatic removal of normally present errors or for correcting variations in balance, sensitivity, and linearity in data recording and telemetering systems.

The automatic correction of raw data for instantaneous display or analysis has been pursued as an extremely desirable goal for many years, especially in the engineering fields. In these fields, the mass collection of data is becoming increasingly important in the exploitation of the product to maximum attainable performance or usefulness. This alone, however, is not sufficient unless this functional capacity is obtained rapidly and competitively. As applied to aircraft currently being developed, it is necessary that data be obtained in environmental and performance extremes that are as rigorous on the instrumentation systems as on the aircraft being tested. Although these environmental extremes exist, the necessity for obtaining accurate data is undiminished. Since these extremes combine to produce balance, linearity, and sensitivity changes in the employed instrumentation system, it is necessary that these changes be individually detected and corrected before automatic data analysis can proceed. Should it be desired to monitor through telemetering, certain critical measurements during flight to assist the pilot in critical demonstration maneuvers, it is even more important that the error producing effects be continually detected and corrected while the flight program progresses.

In view of the considered importance of telemetered data for critical evaluation programs combined with the importance of securing a large quantity of data that may be rapidly and automatically analyzed, the supplementary airborne instrumentation system is compatible with the major components of the telemeter system. In pursuance of this goal for a data gathering system that can measure information from static through relatively high frequency conditions, the airborne equipment is preferably, but not limited to, an FM telemeter system and a multihead magnetic tape FM recorder system which employs the same end instruments and electronic components as required for the telemetering. This arrangement also permits the use of the telemeter ground station for the playback of either the airborne magnetic tape recorded data or for the visual presentation and automatic analysis of the telemeter data. Consequently, the procurement of the basic components for one system, airborne and ground, also provides the major components for the other.

The resulting centralized automatic data instrumentation facility was established to provide a means of receiving, storing, and displaying telemeter data information, permitting the playback of airborne or ground recorded magnetic tape data, automatically correcting for the major data recording or transmission errors, and automatically providing analogue time history plots of the desired magnetic tape recorded or telemetered data rapidly and economically.

The improved recording and telemetering system comprises an airborne calibration unit which periodically introduces balance, sensitivity, and linearity calibration signals into flight data signals, and a ground station data-adjusting unit which, while comparing the calibration signals with precisely controlled reference signals, adjusts ground station data-transforming circuits in such a manner as to remove from them substantially all errors of balance, sensitivity, and linearity. The elimination of such errors makes it feasible to automatically plot test data to predetermined scales on records that require no further data reduction before analysis and review by appropriate personnel. This elimination of manual data reduction procedures results in faster, more reliable, and more economical data processing. These calibrating and adjusting operations are accomplished automatically at certain preset intervals, and may also be initiated manually at any time. The corrected data signals may be recorded on magnetic tape and/or supplied to indicating or plotting instruments for immediate display and use. Manual and semi-automatic data reduction procedures are eliminated, and usable data of increase reliability is supplied quickly and economically.

In an aircraft test program, distinct advantages are gained by the continuous, moment-to-moment knowledge of flight test conditions obtainable by monitoring this information as displayed on meters, cathode ray oscillographs, or other instruments in the ground station. Dangerous flight conditions, failure of aircraft equipment, etc. may be relayed immediately to the operator of the aircraft. Similarly, other useful information and instructions, such as instructions concerning the best timing or manner of accomplishment of a particular maneuver, may be shown or suggested to ground station personnel by the displayed data, and may be relayed by radio to the aircraft operator.

In addition to testing facilities, obviously recording and telemetering systems including the correction unit may be utilized to good advantage in the testing programs of other vehicles, as automobiles, tanks, etc.

It is desirable, therefore, to provide an improved recording and telemetering system which may be operated efficiently by briefly trained, relatively unskilled personnel, and is capable of providing automatically corrected raw recorded or telemetered data for instantaneous display or analysis.

Accordingly, it is an object of the invention to obtain an automatic correcting unit that provides for the correction of substantially all errors in data channel signals resulting anywhere in the data recording and telemetering system from the end instrument battery to the output on the ground station.

It is an object of the invention to provide a correcting unit for data recording and telemetering systems that automatically corrects for the systems' variations in balance regardless of their origin to obtain an accurate presentation of recorded and telemetered data by adjusting the output or proportional voltage variations of the systems to zero output to provide a corrected output that is essentially proportional to the end instrument output and the corrected output becomes zero when the end instrument output is zero.

Another object of the invention is to provide for data recording and telemetering systems a unit that automatically corrects for the systems' variations in sensitivity regardless of their origin by adjusting the proportional voltage variations or output of the systems to a preset reference voltage to provide an output that is corrected to a constant proportionality in the linear portion of the systems.

Likewise, a further object of the invention is to provide an automatic linearity correcting unit for data recording and telemetering systems that provides a precise correction unit output voltage for said given quantity sensed by the end instrument.

Another object of this invention is to provide automatic corrections or balance, sensitivity, and linearity variations in data recording and telemetering systems that result due to variations in component characteristics and in ambient environmental conditions, such as temperature, humidity, and instrument battery voltage, power supply voltage, filament voltage, and transconductance of the subcarrier oscillator tubes.

Another object of the invention is to provide a recording and telemetering system, of the type described, which permits the transmission and correction of a plurality of individual signals whose frequencies correspond to the output voltage of a like plurality of end instruments whereby the changes or variations in balance, sensitivity, and linearity are individually detected and corrected to provide accurate data for an automatic data analysis plotter system or for monitoring, through telemetering, certain critical measurements during flight.

Still another object of the invention is to provide a new and improved recording and telemetering system of the type described having an automatic balance, sensitivity, and linearity correcting unit wherein the output thereof or the equivalent proportional voltage variations are identical to the recording and telemetering system original input or end instrument data channel voltage variations.

Other objects and advantages of the invention will be apparent from the following detailed description, together with the accompanying drawings, submitted for purposes of illustration only and not intended to define the scope of the invention, reference being had for that purpose to the subjoined claims.

Briefly stated our balance, sensitivity, and linearity correcting unit for a data recording and telemetering system is a servo-adjusted correction system that, in conjunction with a minimum of airborne equipment, provides an automatic four-point calibration and linearization of a telemetering system and/or of magnetic tape recording instrumentation systems. This correcting system prevents the introduction of errors into recorded and telemetered data from the recording and telemetering system per se. Specifically, this recording and telemetering system error correction unit comprises an airborne calibration unit which applies discrete calibration steps to each airborne FM data channel used and an automatic servo calibration ground station unit for adjusting the data output to conform to the discrete data steps of the airborne calibration unit. Further, the automatic servo calibration unit is maintained in synchornization with the airborne calibration unit by synchronizing information transmitted in the data channels. Accordingly, this error correction system corrects substantially all the errors occurring from the battery that supplies power to the end instrument in the airborne unit, through the entire airborne unit, and through the entire ground station unit.

Although our basic invention is adapted to be employed in many types of telemetering and/or recording systems, the preferred embodiment illustrated hereinafter in detail is utilized with an FM (frequency modulation) transmitting and/or recording device as the airborne data sensing and signal producing means and FM receiving and/or playback means.

For a better understanding of the invention, reference may be had to the following description taken in connection with the accompanying drawing in which.

To obtain automatically analyzed data or to obtain accurate visual presentation of telemetered data, a most vital component is an apparatus which automatically corrects for recording and telemetering system variations of balance, sensitivity and linearity regardless of their origin. Consequently, corrections must be made for the effects of the major errors as end instrument supply voltage variations, amplifier balance and gain changes, subcarrier oscillator center frequency drifts and sensitivity variations, and for the effects of the minor errors as ground station balance and sensitivity drifts and if required, steady to quasi-static variations of magnetic tape speeds during recording and playback, and magnetic tape elongation.

The center frequency drifts of both the subcarrier oscillators and the discriminators may result from component aging in both units from supply voltage changes, and from temperature changes.

Sensitivity changes in both the subcarrier oscillators and discriminators may result from the immediately foregoing causes of center frequency drifts, and also due to changes in the end instrument battery supplies. The proportion of battery voltage change is equal to a like proportion of sensitivity error introduced.

Figure 1:
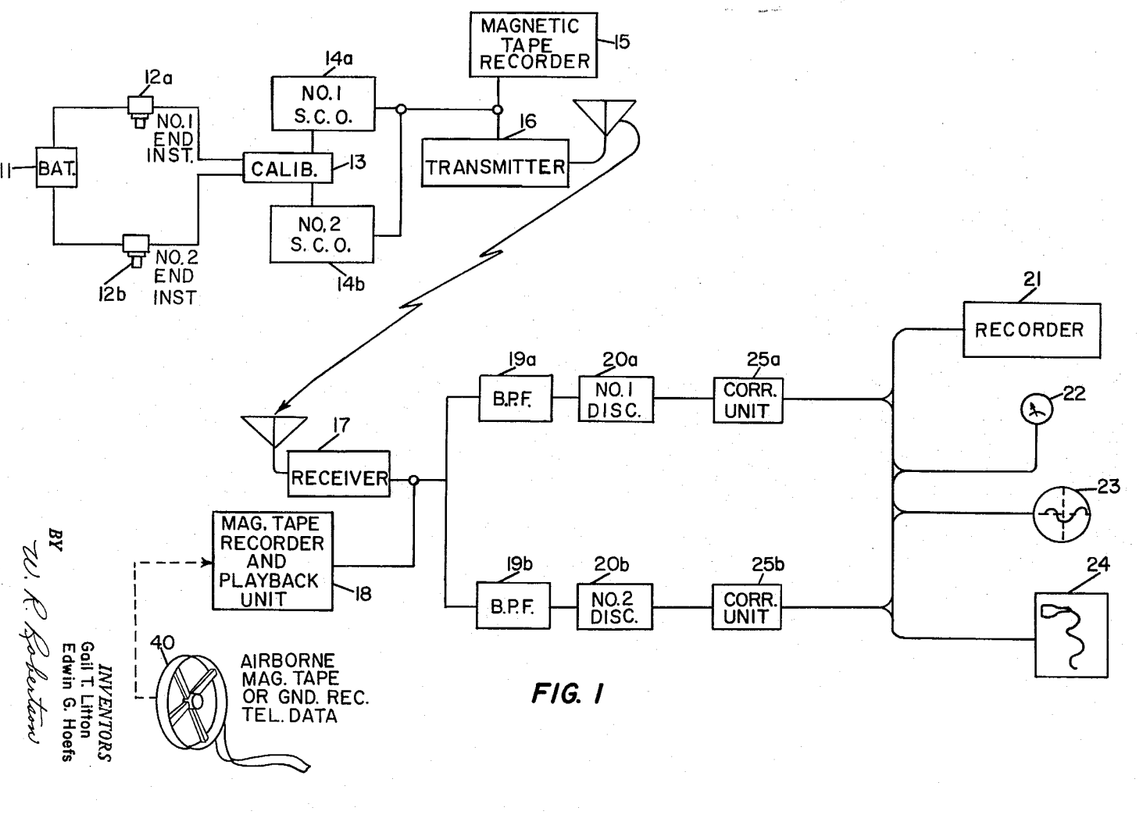
FIG. 1 is a schematic illustration of two automatic balance, sensitivity, and linearity correcting units as applied to an FM data recording and telemetering system having two data channels.
Figures 6, 7:
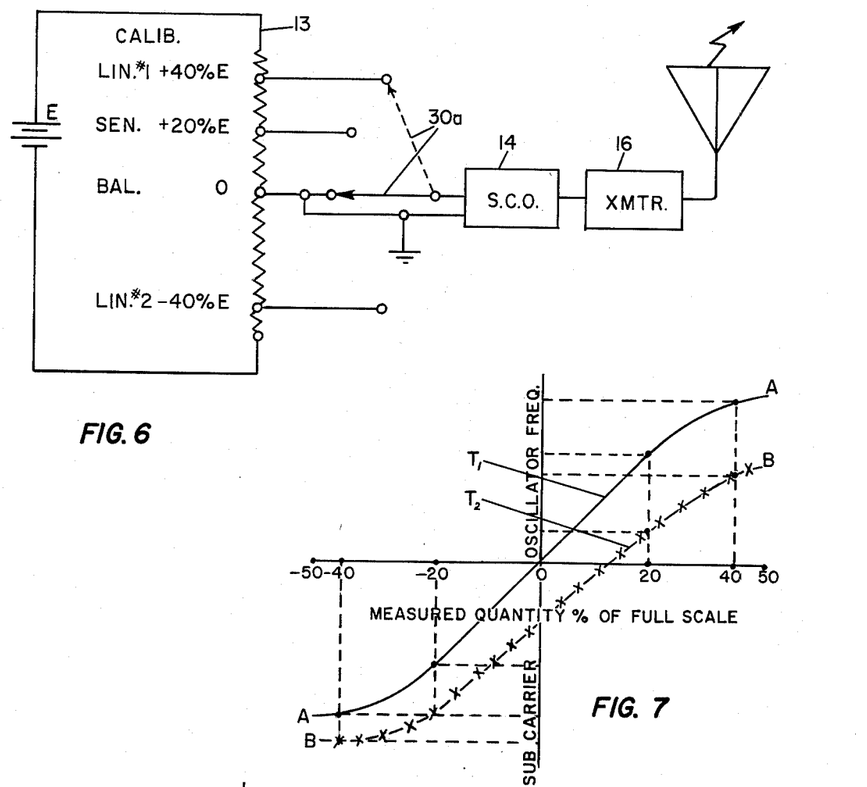
FIG. 6 is a detailed schematic illustration of the calibrator utilized in the recording and telemetering systems disclosed.
FIG. 7 illustrates an accumulative change in subcarrier oscillator frequency versus measured data for two widely separated time intervals when non-linear circuit elements are present.
Figure 8:
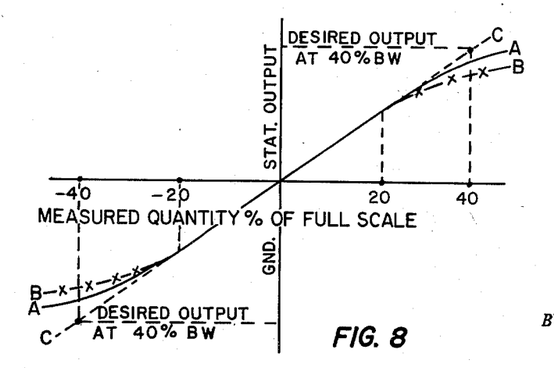
FIG. 8 illustrates the corrected output of the automatic balance, sensitivity, and linearity correcting unit after the balance and sensitivity steps are applied within the linear portion and the linearity steps are applied to the high and low ranges of the curve of FIG. 7.

Non-linear output-input characteristics of both subcarrier oscillators and discriminators may result beyond the ±30 percent linear range of input signal voltage where the frequency change is subject to a decrease of incremental sensitivity for higher or lower input signals, noting FIGS. 7 and 8, for example. Accordingly, the output of the subcarrier oscillators and discriminators is fairly linear throughout the midportions of their respective ranges, but becomes increasingly low as either extreme of their respective ranges is approached. The subcarrier oscillators and the discriminators thus tend to introduce errors of non-linearity when input into those units becomes relatively high.

Where the data is recorded in airborne recorder 15 and played back into the ground station equipment through playback unit 18 for example, this latter unit 18 may introduce further errors of balance, sensitivity, and linearity.

*FM recording and telemetering system*

A typical recording and telemetering system to which we connect our correcting unit for automatically correcting all balance, sensitivity, and linearity errors consists of an airborne unit and a ground station unit, FIG. 1.

The basic components of the airborne unit comprise a multiplicity of A.C. or D.C. excited end instruments or transducers which sense the desired physical quantity as for example, number one and number two end instruments, 12a and 12b, respectively, for each continuous or commutated FM channel utilized, for detecting flight test data; a power source, as battery 11; a calibrator 13; subcarrier oscillators 14a and 14b (one for each end instrument) for producing signals which vary with or correspond to their respective end instrument output voltage variations; a recorder as airborne magnetic tape recorder 15 for transcribing the flight data, if so desired, for play back later after physical transfer of the tape to the receiving station; and a conventional FM or PM (phase modulation) transmitter 16 which emits RF (radio frequency) signals simultaneously containing the data or calibration signals delivered to the transmitter by all the subcarrier oscillators.

The basic components of the ground station unit as illustrated on FIG. 1 comprise an FM receiver 17; a recording magnetic tape recorder and play back unit 18 for continuous recording of all transmitted FM data received for future play back or for play back of the airborne magnetic tape, on reel 40, if so desired; a band pass filter 19a and 19b for each end instrument; a discriminator 20a and 20b for each band pass filter for converting the signal variations to equivalent proportional voltage variations; our new balance, sensitivity, and linearity error correcting units 25a and 25b, one unit for each data channel, the circuit for correction of two commutated channels of which are illustrated and described in detail hereinafter; and the instruments for receiving the final output of the recording and telemetering system comprising, for example, a recorder 21 as a Sanborn type pen recorder for providing a permanent record, a meter display 22 for visual presentation of telemetered data, an oscilloscope 23 for visual display of high frequency data, and/or a plotter 24 as a light beam galvanometer or oscillograph recorder for providing a permanent transcript of the telemetered data.

The number of individual correcting units is chosen to be compatable with the number of available play back or telemetering channels.

Additional details or examples of the above elements are as follows:

End instruments 12a and 12b may comprise a potentiometer, thermocouple, strain gauge, or a data channel;

Calibrator 13 is an airborne instrument for applying known percentage calibration steps to the various types of airborne subcarrier oscillators constructed for proper sequential operation with the correcting unit on the ground;

Subcarrier oscillators 14a and 14b may be of the type whose frequency may be controlled by a reactance tube connected across the tuned circuit wherein its output frequency is proportional to the D.C. voltage input to the subcarrier oscillator, such as but not limited to the Hartley or multivibrator type subcarrier oscillator. Further frequency responses up to 2100 c.p.s. can be multiplexed into one common transmitter;

RF transmitter 16 is of the conventional FM or PM type having an RF power output depending on the installation requirements;

Receiver 17 may be of the conventional FM type whose output consists of the complex subcarrier oscillator signals that were applied to the transmitter;

Band pass filters 19a and 19b may be elements of a subcarrier amplifier, each of which separates out each individual subcarrier signal from the composite output of the receiver 17; and Discriminators 20a and 20b which provide demodulation of the individual band pass filters may be of the pulse averaging type and each may employ a univibrator circuit which senses direction and magnitude as a function of the deviation of the subcarrier signal from its nominal center frequency. The frequency of the univibrator may be controlled by a plug-in tuning unit and a bias voltage on its stable section.

It is further pointed out that while the automatic balance, sensitivity, and linearity correcting unit of the invention described hereinafter is described for use with the above disclosed recording and telemetering system, obviously the correcting unit may also be utilized for correcting balance, sensitivity, and linearity errors in the output of other recording and/or telemetering systems.

*Automatic balance, sensitivity, and linearity correcting unit*

The balance, sensitivity, and linearity correcting units 25a or 25b, FIG. 1, is a servo adjusted or servo actuated correction system that, in conjunction with the minimum of equipment in the airborne unit described above, provides an automatic four point calibration and linearization of FM telemetering systems and of FM recording instrumentation systems, as a magnetic tape recording system, for example.

Four types of calibration or correcting signals are delivered by the calibrator through a connecting electrical circuit to the airborne subcarrier oscillators 14a, 14b, etc. one for each channel being utilized. The four distinct steps for calibration of (1) balance, (2) sensitivity, (3) high-range non-linearity, and (4) low-range non-linearity errors are accomplished in rapid sequence in one calibration period. The calibration period is repeated at precise intervals, such as every five minutes, under automatic control of a timer (not shown) included in the calibrator 13. During the calibration period, which requires for instance, one second for each calibration step, no data signals are supplied by the end instruments 12 to the subcarrier oscillators 14. In addition, a separate pilot's maneuver control is provided which would immediately activate the calibration control in all channels for one cycle and prevent a reoccurrence of the 5 minute calibration period during the specific evaluation or demonstration maneuver of the vehicle. This maneuver control also produces a separate and distinct signal which is delivered to a subcarrier frequency channel to indicate that a maneuver is in progress. This maneuver signal as subsequently delivered from the ground station discriminator is employed to control automatic plotters for only the maneuvers. This coding may be accomplished by various means, as tone control, amplitude, or frequency variations. The automatic plotter utilized is preferably a stable plotter that inherently possesses good balance and sensitivity stability to accurately reproduce the measured data. Since an automatic balance sensitivity calibration is taken just preceding a maneuver, and since most maneuvers or test runs are completed during a period of 30 to 40 seconds, few if any additional errors are incurred during this time interval.

To fully cope with the operational requirements of piloted aircraft flight testing, the maximum time interval for each calibration step as mentioned above is limited to just one second, automatic corrections are provided for center frequency drifts of up to ±20% of band width and for sensitivity changes of ±20%, the repeatability of the ground station unit output for each calibration step is established to be equal to or better than 0.2% of full scale band width, and the voltage outputs from each discriminator circuit for a given calibration step are identical. Consequently, this automatic balance, sensitivity, and linearity error correcting system provides the following:

(1) Data signals that are fully corrected for balance and sensitivity variations. Since a known proportionality exists between these signals and the measured quantity, visual display meters, direct writing oscillographs or analogue plotters may be set up for operations quickly and conveniently in the ground station unit by comparison with standard reference voltages. Consequently, transmission from the test aircraft or precision frequency measurements of the various subcarrier oscillators is not required during this setup period.

(2) A considerable reduction in the aircraft checkout and setup times are accomplished for both airborne recording and telemetering. The primary check is to determine if any of the subcarrier oscillators 14 have drifted beyond the wide tolerances established for satisfactory operation.

(3) The data transmitted by FM telemetering is continuously corrected. Thus this data can be displayed with full confidence of accurate presentation and/or can be plotted as analogue time history data while the flight program progresses.

(4) Equipment is provided that permits rapid and accurate play back of the airborne recorded data into analogue plotters which have been set up to the known calibration step values.

*Correcting unit—balance step*

Figure 2:
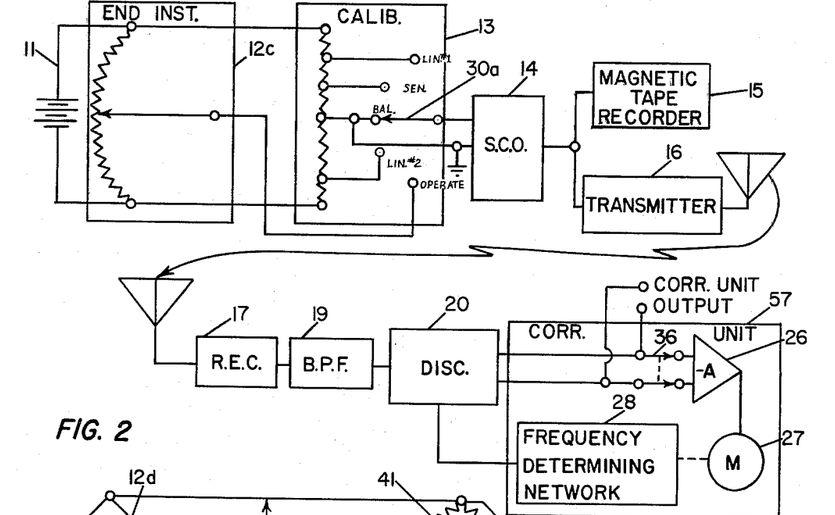
FIG. 2 schematically illustrates the balance error correcting portion of the correcting unit utilized in an FM data recording and telemetering system having a potentiometer type end instrument.
Figure 3:
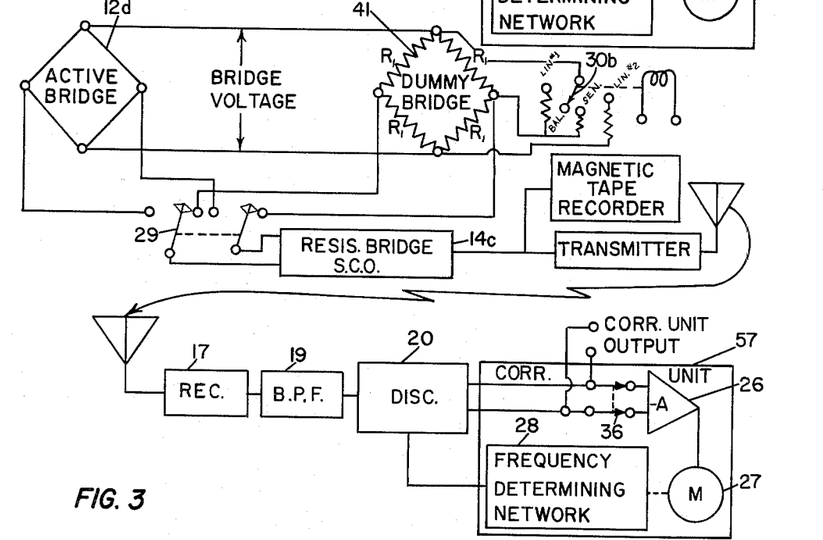
FIG. 3 is similar to FIG. 2 except a strain gauge or resistance bridge type end instrument is utilized in the data recording and telemetering system.

In the automatic correcting unit 25 the balance error correcting step of the calibration cycle is effected within the correcting unit portion 25a illustrated in FIGS. 2 and 3, which includes a closed loop null balance amplifier system illustrated therewith in conjunction with the discriminator 20, there being one system employed for each ground station discriminator channel for balance error correction. Each null balance system comprises a high gain amplifier 26 and a servo motor 27, as a reversible induction motor for example, for driving a frequency determining network 28 or null balanced servo system such as but not limited to, a servo driven balance potentiometer 28a as disclosed in FIG. 10. Other amplifiers may be used, as a differential servo amplifier, for example.

Signals which contain balance errors result in plotted or visually displayed data that is quite accurately indicative of range of variation in intensity or amplitude of the functions measured, but whose values are uniformly in error in one particular direction throughout their entire range. For instance, if temperature is the function indicated, all values shown may be five degrees too high; or, where deflection of an aircraft horizontal control surface is indicated, all values may read, for example, two degrees too high above neutral.

It may be noted that FIGS. 2 and 3 each illustrate a different type of end instrument that may be used for each channel in the airborne unit of the recording and telemetering system disclosed, both being shown performing the balance step of the calibration cycle.

FIG. 2 is an illustration of the potentiometer type end instrument 12c supplied with voltage from battery 11.

For balance calibration of a particular data signal, the end instrument voltage to the subcarrier oscillator 14, FIG. 2, is interrupted by movement of the calibrate sequence switch 30a, FIG. 2, to the balance position shown, or grounded position, and zero voltage is supplied to the subcarrier oscillator 14 by the calibrator 13. The sequence switch 30a is operated by and in sequence with the airborne calibrator 13. The subcarrier oscillator 14 is so designed that when its input is zero, its output is nominally at its center frequency. When, in the telemetering process, an exact center-frequency signal from the subcarrier oscillator 14, for example, FIG. 2, reaches a corresponding discriminator 20, the discriminator, when in balance, will in turn have a D.C. voltage output of zero, this voltage level being in exact correspondence with the accompanying zero-voltage output of the end instrument 12c or the calibrator 13 to the subcarrier oscillator 14. Balance errors in the system appear as off-center response of the subcarrier oscillator 14 to the zero-voltage balance correction step, and appear as a deviation of discriminator voltage output from zero. Total balance error of the system appears as total negative or positive deviation of discriminator signal output voltage from zero, FIG. 2, and may be corrected by adjusting discriminator signal output to zero during the balance calibration step. The frequency determining network 28 regulates components of the discriminator circuits which transform the varying frequencies of discriminator input into corresponding variations in D.C. output voltage, and affords a means of adjusting the balance of the signal emitted by those circuits. For the balance correcting step, calibrate sequence switch 30a, FIG. 2, is set to ground position, or zero voltage input to the airborne subcarrier oscillator position whereby the subcarrier oscillator is operated at its nominal center frequency, the resulting frequency of which is transmitted through the recording and telemetering system to the input of the ground station discriminator. If there is a difference between the transmitted frequency and the frequency to which the discriminator is adjusted, there will be a D.C. output voltage proportional to this difference and which D.C. voltage output is applied to the servo amplifier 26, FIG. 2, that drives the frequency determining network 28, which in turn corrects the discriminator until the corresponding output of the discriminator is zeroed. Accordingly, the net result of the balance step is the automatic adjustment of the discriminator and which adjustment provides zero output voltage for the calibrator so that balance errors are removed from the next succeeding telemetering system output signal to provide a corrected output that is essentially proportional to the end instrument output and the corrected output becomes zero when the end instrument is zero. At the end of the correction period with the above adjustment or correction accomplished, data signal values are in proper balance. Null balance amplifier selector switch 36 disconnects the amplifier when not in use or calibrating.

FIG. 3 illustrates the use of a different type of end instrument in the disclosed recording and telemetering system including a strain gauge or resistance bridge type end instrument 12d with its associated dummy bridge 41. The ground station unit and correcting unit for the recording and telemetering system of FIG. 3 is similar to that of FIG. 2. For the balance step, calibrate sequence switch 30b is moved to open position or balance position indicated in FIG. 3. The balance, sensitivity, and linearity positions on the dummy bridge comprise shunt resistors illustrated, FIG. 3, that will produce calibration step bridge voltages that are equal to the test condition bridge outputs for four specific values of the measured quantity. For providing a calibration unit for the strain gauge type bridges, the dummy bridge 41, FIG. 3, with comprises four precision low temperature coefficient resistors $R_1$ is employed to produce specific values of the measured quantity. This system provides a means of determining the balance, sensitivity, and linearity variation of the recording and telemetering equipment. During the balance step of the calibration cycle, the input of the resistance bridge controlled subcarrier oscillator 14c is switched by means of the operate calibrate switch 29 from the active bridge 12d to the right or to the output of the dummy bridge 41. A timer control unit (not shown) in the calibrator selects the appropriate calibration step at an appropriate time interval, as one second for example in our case, in a given sequence for all channels simultaneously, thereby actuating calibrate sequence switch 30b and calibrate switch 29 at the proper instant. Calibrate sequence switch 30b is then in the balance position where there is no shunt resistance across the dummy bridge. Operate calibrate switch 29 which disconnects the active bridge 12d or end instrument from the circuit during each of the four steps of the calibration cycle is moved to the left or operate position by the timer control unit after the calibration steps are completed where it is positioned for the rest of the time or for normal operation. Magnetic tape recorder 15 and transmitter 16 may be identical to those of the embodiment of FIG. 2.

While the balance operation of FIG. 3 is similar to that of FIG. 2, this operation may be employed with various put there is injected a counter voltage which is equal in magnitude and opposite in phase. The value of this voltage may be controlled by a closed loop null balance servo system whereby, as the net result at the completion of the balance step, the resultant output will be zero.

Figure 10:
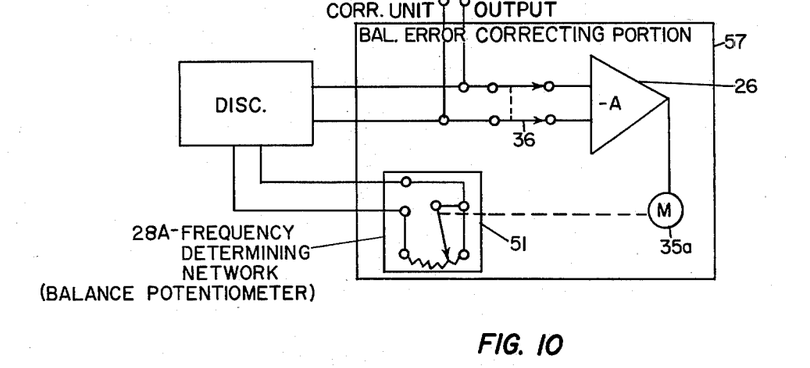
FIG. 10 shows a typical method or circuit used as the frequency determining network in the ground station units of FIGS. 2 and 3 for correcting pulse averaging type FM data during the balance step.

FIG. 10 shows a typical circuit that may be used as the frequency determining network in the ground station units of FIGS. 2 and 3 for correcting pulse averaging type FM data during the balance step. This closed loop null balance amplifier system is employed in each ground station discriminator channel and comprises the high gain amplifier 26, a servo driven potentiometer 51, and a ref-types of discriminators, wherein at the discriminator outerence voltage, a servo motor 35a, all of established accuracy, reliability, and proven design. The "reference voltage" of the preceding sentence, bearing no reference numeral, is zero in the embodiment just described. It will be better understood why this terminology is adopted when no E.M.F. producing component is specifically pointed out when it is considered that the balance correction involves a comparison of the transmitted balance signal to a signal provided on the ground which is the same as the ideal (not subject to error) value of the received balance signal, the comparison between the two being made by amplifier 26. In the specific embodiment just described, the reference voltage and the calibrator signal voltage (when not subject to error) are both zero. If a finite value were selected for the calibration voltage, obviously then the reference voltage would show up in the amplifier circuit as a tangible object producing a finite E.M.F.

*Correcting unit—sensitivity step*

Figure 4:
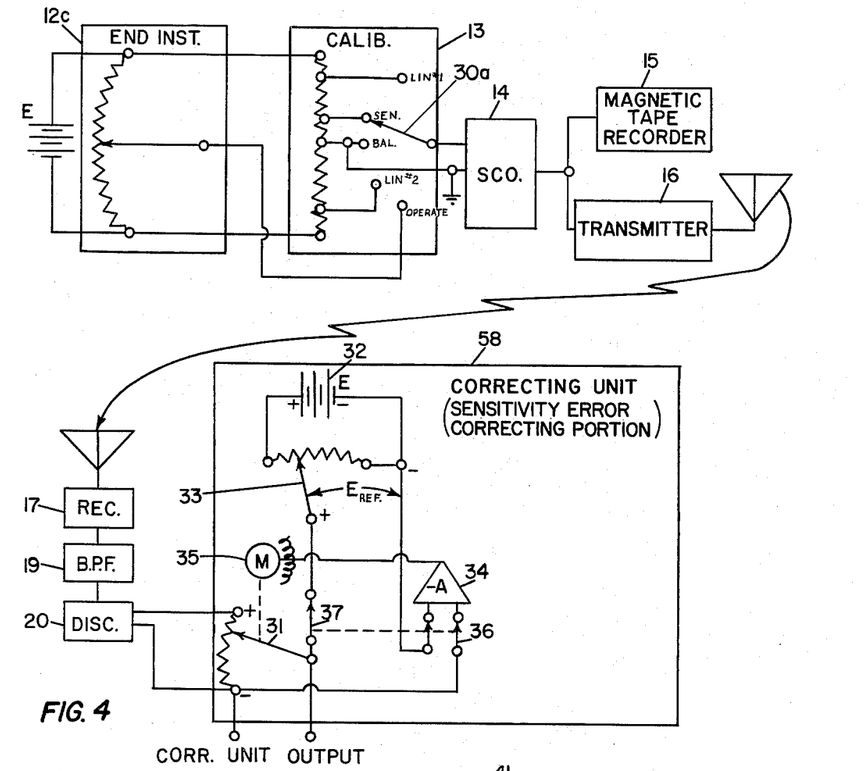
FIG. 4 illustrates the sensitivity error correcting portion of the correcting unit utilized in an FM data recording and telemetering system having a potentiometer type end instrument.
Figure 5:
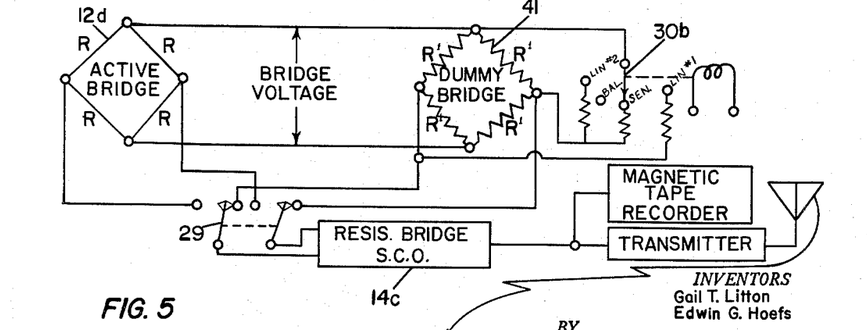
FIG. 5 illustrates a different type of airborne unit utilizing a strain gauge or resistance bridge type of end instrument with its associated dummy bridge that may be used in the recording and telemetering system of FIG. 4.

FIGS. 4 and 5 illustrate schematically the circuits of two recording and telemetering measurement systems, each having a different type of end instrument, and also illustrate the portion 58 of the correcting unit for correcting voltage variations in sensitivity.

FIG. 4 shows the potentiometer type of end instrument 12c in the airborne unit of the recording and telemetering system disclosed hereinbefore relative to FIG. 2 and the correcting unit portion 58 which is connected in the system for performing the sensitivity step in the calibration cycle.

For correction of variations and changes in end instrument battery voltage, subcarrier oscillator deviation sensitivity, discriminator output sensitivity, and for any other changes in sensitivity of the airborne and ground station units, the correcting unit portion 58 is provided that includes a servo adjusting sensitivity control circuit which employs for each channel a null balance amplifier circuit as illustrated in FIG. 4, comprising a servo driven potentiometer 31 connected as a voltage divider on the output of the discriminator 20. More specifically this sensitivity correcting portion 58, FIG. 4, of the correcting unit 25 comprises a reference voltage source as battery 32 with variable resistance 33, high gain amplifier 34 and servo motor 35 for driving potentiometer 31 to provide the correcting unit output. Operate calibrate switch 36 is closed only during the calibration period. The balance-disconnect switch 37 is ganged with switch 36 for operation or closing only during the sensitivity step of the calibration cycle.

To correct these errors in sensitivity, calibrate sequence switch 30a, FIG. 4, is moved to the sensitivity position illustrated on the calibrator 13, subsequent to completion of the balance step, whereby a known percentage, as for example, a plus 20 percent of the end instrument range, illustrated in FIGS. 4 or 6 particularly, is supplied to the subcarrier oscillator 14. Immediately on the ground, the correcting unit output signal is adjusted by the servo adjusting sensitivity control circuit of the correcting unit portion 58. This adjusted output is balanced against a preset reference voltage $E_{REF}$ set by variable resistance 33 from battery 32 to produce a zero input signal to the servo amplifier. Accordingly, the correcting unit output voltage, FIG. 4, during the sensitivity step is adjusted to be equal to the preset reference voltage so that sensitivity errors are removed from the next succeeding telemetering system output signal to provide an output that is corrected to a constant proportionality in the linear portion of said telemetering system. This reference voltage level is established to be compatible with the maximum sensitivity variations which can be experienced and less than the discriminator output at minimum sensitivity range.

For the recording and telemetering system of FIG. 5 utilizing a bridge type end instrument 12d with its associated dummy bridge 41 and appropriate shunt resistances for unbalancing the bridge to correspond for a given sensitivity step in the airborne unit, a correcting unit 25, not shown for purposes of clarity as it may be identical to that described above and illustrated in FIG. 4, is incorporated for the purpose of performing the sensitivity step of the calibration cycle. While the airborne unit of both FIGS. 3 and 5 are identical, that of FIG. 5 is illustrated in the sensitivity step position instead of the balance step position of FIG. 3.

In both balance and sensitivity steps, to provide the intelligence for detecting and selecting the desired signal, a specific subcarrier oscillator frequency band is employed to transmit a coded signal to the ground station unit. A polarized sensitive relay detector (not shown) located in the correcting unit is employed at the corresponding ground station discriminator output to control the appropriate sequence operation of each of the automatic balance and sensitivity correction units 57 and 58 for sensing zero output and for comparative adjustment to the predetermined reference voltage.

*Correcting unit—linearity steps*

Figure 9:
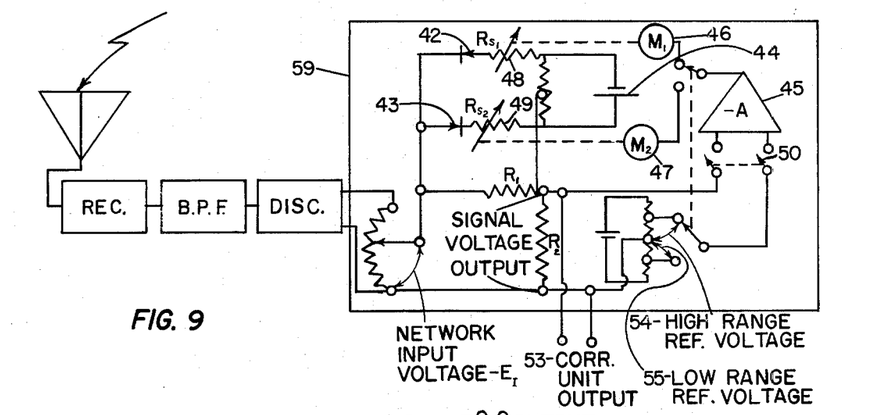
FIG. 9 is a schematic illustration of the linearizer network.

A third type of error or voltage variation encountered at the output of recording and telemetering systems are errors in linearity which result when non-linear circuit components are employed. While a common origin of these recording system non-linearities are in the subcarrier oscillators, and the discriminators, they may result from various other non-linear circuit components. Consequently, the use of linear scale plots, or linear scale displays obviates the receiving of precise and accurate indication of the measured quantity. Since it is considered to be only practical to employ linear units for display and plotting, it is necessary to employ two further calibration points in addition to the balance and sensitivity points or steps to detect non-linearities. A linearizer circuit portion 59, FIG. 9, is accordingly incorporated as a part of the automatic correcting unit to straighten these non-linearities to a linear slope as will be explained hereinafter in connection with FIGS. 7 and 8.

FIG. 7 depicts possible accumulative changes in subcarrier oscillator frequency versus measured data for two widely separated time intervals, i.e., those which may occur during any long term operation when non-linear circuit elements are present, as illustrated by a typical plot of the subcarrier output frequency as solid line curve A—A taken at one instant ($T_1$ for example) and plot, or as broken line curve B—B taken at a later instant ($T_2$). The displacement and rotation of curve B—B with respect to curve A—A indicates changes in balance and sensitivity have occurred in both the linear and non-linear portions. In the middle portion, where the curve is substantially linear, it is evident that the two parameters, balance (or vertical displacement) and sensitivity (or slope) characterize its location completely, and that the correction of these two parameters therefore provides complete data correction. Without additional correction for error in linearity, such is not the case in the upper and lower regions of the curve. Linearity corrections are therefore required in order to obtain more fully corrected data when operating in ranges corresponding to the non-linear upper and lower regions of the curve.

FIG. 8 indicates the correction unit's output curve C—C wherein the balance and sensitivity corrections or steps have been applied which results in complete correction for the middle 40 to 60% of the curve. The application of the linearity corrections produces a rotation of the curve ends to conform substantially to the indicated desired linear output curve C—C.

While substantially linear in response within the midportion of their respective ranges, the subcarrier oscillators primarily and perhaps, the discriminators become increasingly non-linear in response toward the upper and lower extremes of their ranges, FIGS. 7 and 8. In each, sensitivity becomes increasingly lower as a range extreme is approached, and both may introduce non-linear errors of sensitivity into data signals.

For removing errors of non-linearity from data signals, calibration and correcting operations are accomplished in two steps subsequent to completion of the sensitivity step. The first step eliminates non-linearities from the high range of the system, and is immediately followed by the second step which removes non-linearities from the lower extreme of the range. A simple linearizing network 59, one network for each end instrument, is provided in the signal correcting unit 25 as illustrated in FIG. 9. Correction is accomplished by the introduction of high- and low-range calibration signals into the airborne subcarrier oscillator, and by servo adjusting a high-range and a low-range potentiometer in the linearizing network of the data-adjusting unit.

*Correcting unit—high range non-linearity step*

For high range non-linearity calibration of one channel for example, as the end instrument senses the desired given physical quantity, its input into the subcarrier oscillator 14, FIG. 6, is interrupted by movement of calibrate sequence switch 30a, to a position to obtain a high-range calibration output voltage equal to any particular high percentage, as +40% in the illustrated case for example, of the end instrument's voltage range above zero. On the ground, the resulting discriminator output voltage as previously illustrated in FIGS. 2–4 is passed through the linearizer network as shown in FIG. 9, and described hereinafter.

The linearizer comprises $R_1$ and $R_2$ series resistors shown above which operate for all practical purposes as an ordinary voltage divider network so long as neither diode 42 nor 43 conduct. As the voltage across $R_1$ begins to exceed the voltage of the diode bias battery 44, one of the diodes will begin to conduct, effectively shunting $R_1$. This shunting of $R_1$ increases the incremental gain of the network. The relative change in voltage output resulting from the shunting characteristics of one of the linearity potentiometer resistances $R_{s_1}$ or $R_{s_2}$ may be expressed in terms of an increase in the correcting unit output voltage 53 of the network. The relative change in correcting unit output voltage 53 as compared to the network input voltage $E_I$ is substantially equal to:

$$\frac{R_2 E_I}{R_2 + [R_1 R_s/(R_1 + R_s)]} \div \frac{R_2 E_I}{R_1 + R_2}$$

where:

$E_I$—network input voltage.
$R_s$—equals the linearity potentiometer resistance associated with the conducting diode.

Thus an increase in sensitivity of the correcting unit output voltage referred to the network input voltage $E_I$ occurs beyond a network input signal level that corresponds to the established diode bias voltage.

The high range calibrator step correcting unit output voltage 53 is compared with a high range or preset reference voltage 54 precisely adjusted to a desired theoretical value, as 40 percent of discriminator output as used in the illustrated case. If the linearizing network's high-range section has perfectly corrected the discriminator output signal comprising proportional voltage variations during high range calibration step, no difference will exist between the correcting unit output voltage 53 and the high range reference voltage 54. If a difference does exist between these voltages, this difference is supplied as a control voltage to a servo amplifier 45 thru switch 50 controlling a motor 46 which servo adjusts the high-range potentiometer 48 of the linearizing network until the high-range calibration step correcting unit output voltage 53 equals the high range reference voltage 54.

*Correcting unit—low range non-linearity step*

The low range non-linearity step is similar to the high range non-linearity step with the exception that the operate sequence switch 30a FIGS. 2, 4, or 6, is changed to the low range calibration step position. Thus the low range potentiometer 49 and diode 43 combination is servo adjusted as previously described until the low range calibration step correcting unit output voltage 53 is equal to the low range reference voltage 55, that is, the discriminator proportional voltage variations are adjusted to the preset reference voltage so that linearity corrections are made from the next succeeding telemetering system output signal to provide a precise correction unit output voltage for the given quantity sensed by the end instrument.

Figure 11:
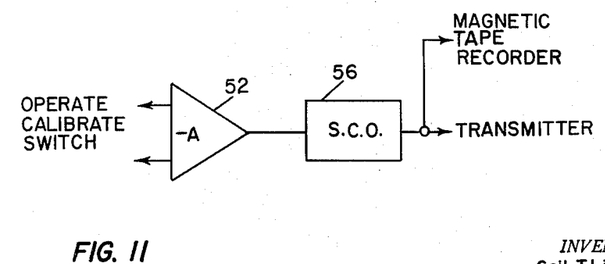
FIG. 11 illustrates an exemplary circuit that may be substituted for the resistance bridge subcarrier oscillator of FIGS. 3 or 5.

FIG. 11 shows an exemplary circuit including an amplifier 52 and a voltage controlled subcarrier oscillator 56 in the airborne station unit that may be substituted for the resistance bridge oscillator 14c of FIGS. 3 or 5 when a D.C. voltage instead of an A.C. voltage is used for excitation of the bridge network.

For a recording and telemetering system utilizing the balance, sensitivity, and linearity correcting unit, the airborne recording or telemetering unit must include provision for simultaneous, four-point, in-flight calibration of all data inputs to the subcarrier oscillator, and for one control channel to be used for coding or synchronizing the servo adjustments of the ground station unit equipment corresponding to the respective calibration steps. The calibration steps supplied to the subcarrier oscillator are converted to audio frequencies which are either transmitted to the ground station unit by telemetering, and/or recorded with an airborne magnetic tape recorder. On the ground, the telemetering receiver or the recorder supplies the subcarrier frequencies to audio FM discriminators to produce D.C. voltage corresponding to the calibration signals driving the airborne subcarrier oscillators. The discriminator outputs are connected to the balance, sensitivity, and linearity correcting unit which corrects these signals to exact correspondence with the airborne signals at the four calibration points.

The corrected output signals can then be plotted automatically as final test results, thus eliminating such laborious processes as manually plotting variables to proper scales and manually reading correction factors from subcarrier oscillator curves.

In use, obviously either the recording or the telemetering system may be utilized, either one in the absence of the other, of our disclosed recording and telemetering system.

The term airborne unit is intended to apply to the unit of the recording and telemetering system comprising at least an end instrument, calibration, subcarrier oscillator, and a transmitter regardless of whether it is airborne or utilized in a ground vehicle.

Further while the airborne unit of the recording and telemetering system is primarily used in equipment aloft when the system is applied to aircraft or airborne equipment testing where data is transferred in signal form from an aircraft to a ground station, obviously the unit referred to hereinbefore as the airborne unit may be utilized anywhere that data is being transferred in signal form from a remote or first position to a receiving or second position, as when the system is applied to the testing of ground vehicles or equipment. Accordingly, we intend for the terms "airborne unit" and "ground unit" to be taken broadly to include all such cases.

It should likewise be understood that the words "transferred" or "transfer" as used herein includes any data signal transfer means, for example, radio transmission, transmission over wires or storage on tape or the like followed by a physical transfer of the storage means.

It is emphasized that while the novel correcting unit is shown herein for correcting the output from two typical channels of the recording and telemetering system, clearly the output signals from numerous channels may be corrected simultaneously in balance, sensitivity, and linearity.

It will be obvious to those skilled in the art that various changes may be made in the invention without departing from the spirit and scope thereof and therefore the invention is not limited by that which is shown in the drawings and described in the specification, but only as indicated in the appended claims.

We claim:

1. A data telemetering system comprising a transmitting unit and a receiving unit, said transmitting unit comprising an end instrument which senses the desired given physical quantity and having an output signal, a subcarrier oscillator calibrator means for momentarily interrupting said end instrument output signal and for supplying a calibration voltage to said subcarrier oscillator as a balance error correcting step in a calibration cycle, said subcarrier oscillator connected to said calibrator comprising means for supplying when its input is said calibration voltage a frequency signal output as the balance calibration signal, said transmitting unit comprising means for transmitting said balance calibration signal to said receiving unit, said receiving unit comprising means for receiving and separating out said balance calibration signal from other foreign signals, discriminator means for receiving and converting said balance calibration signal to equivalent proportional voltage variations, and a correction unit connected in said receiving unit comprising null balance amplifier correcting means, said correcting means comprising an amplifier, a servomotor controlled by the output thereof and a frequency determining network adjustable by said motor, said frequency determining network being operatively associated with components of said discriminator to regulate its output so that balance errors are removed from the next succeeding telemetering system output signal to provide a corrected output that is essentially proportional to the end instrument output and the corrected output becomes equal to the calibration voltage when the end instrument output is equal to the calibration voltage.

2. A data telemetering system as recited in claim 1, said end instrument having an output signal range, said calibrator means comprising means for supplying a signal equal to a precise percentage of said end instrument range to said subcarrier oscillator as a sensitivity error correcting step in said calibration cycle, said subcarrier oscillator comprising means for supplying when its input is said precise percentage of said end instrument range a signal output as the sensitivity calibration signal, said transmitting unit comprising means for transmitting said sensitivity calibration signal to said receiving unit, said receiving unit comprising means for receiving and separating out said sensitivity calibration signal from other foreign signals, said discriminator means comprising means for receiving and converting said sensitivity calibration signal to equivalent proportional voltage variations, and said correction unit comprising servo adjusting sensitivity control circuit means for adjusting said discriminator proportional voltage variations to a preset reference voltage whereby sensitivity errors are removed from the next succeeding telemetering system output signal to provide an output that is corrected to a constant proportionality in the linear portion of said telemetering system.

3. A data telemetering system as recited in claim 2, said calibrator means comprising means for supplying an additional signal equal to a precise percentage of said end instrument range to said subcarrier oscillator as a linearity error correcting step in said calibration cycle, said subcarrier oscillator comprising means for supplying during said last step when its input is said precise percentage of said end instrument range a signal output as the linearity calibration signal, said transmitting unit comprising means for transmitting said linearity calibration signal to said receiving unit, said receiving unit comprising means for receiving and separating out said linearity calibration signal from other foreign signals, said discriminator means having means for receiving and converting said linearity calibration signal to equivalent proportional voltage variations, reference means, and said correction unit comprising servo adjusting linearity control circuit means for comparing said linearity calibration signal to said reference means and adjusting said discriminator proportional voltage variations according to the relationship between said compared signals whereby linearity corrections are made from the next succeeding telemetering system output signal.

4. An FM data telemetering system comprising an airborne unit and a ground station unit, said airborne unit comprising an end instrument which senses the desired given physical quantity and having an output signal proportional to said physical quantity and having an output signal range, calibrator means for momentarily interrupting said end instrument output signal for supplying zero voltage to a subcarrier oscillator during a balance error correcting step in a calibration cycle, said calibrator means comprising further means for supplying a signal equal to a precise percentage of said end instrument range to said subcarrier oscillator during a sensitivity error correcting step immediately following said balance error correcting step in said calibration cycle, and said calibrator means having means for supplying a signal equal to a precise percentage of said end instrument range to said subcarrier oscillator during a linearity error correcting step immediately following said sensitivity error correcting step in said calibration cycle, said subcarrier oscillator connected to said calibrator comprising means for supplying when its input is said zero voltage a frequency signal output as the balance calibration signal, said subcarrier oscillator comprising further means for supplying when its output is said precise percentage of said end instrument range a signal output as the sensitivity calibration signal immediately following said balance calibration signal, and said subcarrier oscillator comprising means for supplying when its output is said precise percentage of said end instrument range a signal output as the linearity calibration signal immediately following said sensitivity calibration signal, said airborne unit comprising means for transmitting said balance calibration signal, said sensitivity calibration signal, and said linearity calibration signal, respectively and consecutively, to said ground station unit, said ground station unit comprising means for receiving and separating out said balance calibration signal, said sensitivity calibration signal, and said linearity calibration signal, respectively, from other foreign signals, discriminator means for receiving and converting said balance calibration signal said sensitivity calibration signal and said linearity calibration signal to equivalent proportional voltage variations, respectively, and a correction unit connected in said ground station unit, a balance error correcting portion in said correction unit comprising null balance amplifier correcting means for adjusting said discriminator balance proportional voltage variations to zero output so that balance errors are removed from the next succeeding telemetering system output signal to provide a corrected output that is essentially proportional to the end instrument output and the corrected output becomes zero when the end instrument output is zero, a sensitivity error correcting portion in said correction unit comprising servo actuating sensitivity control circuit means for adjusting said discriminator sensitivity proportional voltage variations to a preset reference voltage whereby sensitivity errors are also removed from the next succeeding telemetering system output signal to provide an output that is corrected to a constant proportionality in the linear portion of said telemetering system, and a linearity error correcting portion in said correction unit comprising servo adjusting linearity control circuit means for adjusting said discriminator linearity proportional voltage variations to a preset reference voltage whereby linearity corrections are made from the next succeeding telemetering system output signal to provide a precise correction unit output voltage for said given quantity sensed by said end instrument.

5. An instrumentation system comprising an airborne unit and a ground station unit, said airborne unit comprising an end instrument which senses the desired given physical quantity and having an output signal and an output signal range, calibrator means for momentarily interrupting the output signal of said end instrument for supplying zero voltage to a subcarrier oscillator during a balance error correcting step in a calibration cycle, said calibrator means comprising further means for supplying a signal voltage equal to a precise percentage of said end instrument range to said subcarrier oscillator during a sensitivity error correcting step immediately following said balance error correcting step in said calibration cycle, and said calibrator means comprising means for supplying a signal voltage equal to a precise percentage of said end instrument range to said subcarrier oscillator during a linearity error correcting step immediately following said sensitivity error correcting step in said calibration cycle, said subcarrier oscillator connected to said calibrator comprising means for supplying when its input is said zero voltage a frequency signal output as the balance calibration signal, said subcarrier oscillator comprising further means for supplying when its input is said precise percentage of said end instrument range a signal output as the sensitivity calibration signal immediately following said balance calibration signal, and said subcarrier oscillator comprising means for supplying when its input is said precise percentage of said end instrument range a signal output as the linearity calibration signal immediately following said sensitivity calibration signal, means connected in said system for recording said balance calibration signal, said sensitivity calibration signal, and said linearity calibration signal, respectively and consecutively, said ground station unit comprising means for play back and separating out said balance calibration signal, said sensitivity calibration signal, and said linearity calibration signal, respectively, from other foreign signals, discriminator means for receiving and converting said balance calibration signal, said sensitivity calibration signal, and said linearity calibration signal to equivalent proportional voltage variations, respectively, and a correction unit connected in said ground station unit, said correction unit comprising a balance error correcting portion, a sensitivity error correcting portion, and a linearity error correcting portion, said balance error correcting portion comprising null balance amplifier correcting means for adjusting said discriminator balance proportional voltage variations to zero output so that balance errors are removed from the next succeeding instrumentation system output signal to provide a corrected output that is essentially proportional to the end instrument output and the corrected output becomes zero when the end instrument output is zero, said sensitivity error correcting portion of said correction unit comprising further servo adjusting sensitivity control circuit means for adjusting said discriminator sensitivity proportional voltage variations to a preset reference voltage whereby sensitivity errors are removed from the next succeeding instrumentation system output signal to provide an output that is corrected to a constant proportionality in the linear portion of said instrumentation system, and said linearity error correcting portion of said correction unit comprising servo adjusting linearity control circuit means for adjusting said discriminator linearity proportional voltage variations to a preset reference voltage whereby linearitly corrections are made from the next succeeding instrumentation system output signal to provide a precise correction unit output voltage for said given quantity sensed by the end instrument.

6. An instrumentation system comprising an end instrument which senses the desired given physical quantity and the output of said system comprises equivalent proportional voltage variations, a correction unit connected to the output of said system comprising a balance error correcting portion, a sensitivity error correcting portion, and a linearity error correcting portion, said balance error correcting portion comprising a null balance amplifier correcting means for adjusting the output voltage variations of said system to zero output during a balance error correcting step in a calibration cycle so that balance errors are removed from the next succeeding system output signal to provide a corrected output that is essentially proportional to the end instrument output and the corrected output becomes zero when the end instrument output is zero, said sensitivity error correcting portion of said correcting unit comprising servo adjusting sensitivity control circuit means for adjusting the output voltage variations of said system to a preset reference voltage during a sensitivity error correcting step immediately following said balance error correcting step in said calibration cycle whereby sensitivity errors are removed from the next succeeding system output signal to provide an output that is corrected to a constant proportionality in the linear portion of said system, and said linearity error correcting portion of said correcting unit comprising servo adjusting linearity control circuit means for adjusting said system output voltage variations to a preset reference voltage during a linearity error correcting step immediately following said sensitivity error correcting step in said calibration cycle whereby linearity corrections are made from the next succeeding telemetering system output signal to provide a precise correction unit output voltage for said given quantity sensed by said end instrument.

7. An instrumentation system comprising an end instrument which senses a desired given physical quantity and produces an output indicative of values thereof; serially related components receiving and responsive to the end instrument output and including a discriminator producing a system output voltage representing the physical quantity and varying in correspondence with variations in value of the latter; and a correcting unit connected to the output of said system and comprising balance correcting means including: a servomotor; an amplifier, and means for connecting the same to the system output, the amplifier producing and supplying to the servomotor an output proportional to system output; and a frequency determining network connected into the discriminator and having an element connected to and movable by the servomotor for adjusting discriminator performance, the amplifier output in response to the system output energizing the servomotor to move the element, during a balance error correcting step, to a position in which system output is zero and the corrected system output is zero when the end instrument output is zero; the correcting unit further comprising system sensitivity adjusting means including: a second amplifier, a second servomotor; a source providing a preset reference voltage, and means for connecting the reference and system output voltages to the amplifier, the latter producing and supplying to the second servomotor an output proportional to any difference therebetween; and a sensitivity control circuit receiving the discriminator output and having a second element which element is connected to and movable by the second servomotor for adjusting sensitivity in the discriminator output, the second amplifier output in response to system output during a sensitivity error correcting step energizing the second servomotor to move the second element to a position in which the difference between the system output and reference voltage is zero and sensitivity errors are thereby removed from subsequent system output to provide a corrected output that is essentially proportional to the end instrument output.

8. An instrumentation system having a sending and a receiving position comprising, at said sending position, an end instrument which senses a desired given physical quantity and produces a signal varying in accordance with variation in values thereof, and means receiving and responsive to said signal for producing and transmitting an output having values representing the signal values; a receiver at the receiving position receiving the transmitted output and in response thereto producing a system output comprising equivalent proportional voltage variations; and a correction unit connected to the output of the system, the correction unit comprising balance correcting means including: a servomotor; an amplifier connected to the servomotor and connectable and responsive to system output for producing an output proportional to system output and supplied by the amplifier to the servomotor; and an electrical network containing an element electrically connected to the receiver and movable for adjusting the system output which the latter produces in response to transmitted output, said element being connected to and movable by the servomotor, the amplifier output, during a balance error correction step, being zero when system output is zero and varying therefrom, when system output varies from zero, in a manner energizing the servomotor to move the element to a position in which system output is zero so that the corrected system output is zero when the transmitted ouput is zero; the correcting unit further comprising system output linearity correcting means including: a second servomotor; a second amplifier connected to the second servomotor and connectable, during a linearity error correction step, to the system output and a reference voltage source; an electrical network receiving the system output and containing at least one element movable for varying the linearity of the same in a manner correcting system output linearity errors, the second amplifier producing a zero output when the reference and system output voltages are equal and responding to a difference between those voltages by producing and supplying to the second servomotor means an output which energizes the latter to shift the movable element to a position in which the system output and reference voltages are equal and the next succeeding system output voltage is precisely corrected for linearity in relation to the quantity sensed by the end instrument.

9. In combination with a data recording and telemetering system having an output signal voltage, a correcting unit connected in said system and comprising: movable means connected in said system and positionally adjustable for correcting balance errors in said output signal voltage; movable means receiving said output signal voltage and positionally adjustable for correcting sensitivity errors in the same; movable means connected to said system and positionally adjustable for correcting linearity errors in said output signal voltage; means providing a sensitivity reference voltage; means providing a linearity reference voltage; amplifier means connectable to the system output signal voltage during separate balance, sensitivity, and linearity correction steps and also to a corresponding one of the reference voltage providing means during each of the sensitivity and linearity correction steps, the amplifier means producing during the balance step an output voltage related to system output signal voltage and standing at zero when the latter is zero, during the sensitivity balance step an output voltage related to the voltage difference between the system output signal voltage and the sensitivity reference voltage and standing at zero when the difference is zero, and during the linearity step an output voltage proportional to the voltage difference between the system output signal voltage and the linearity reference voltage and standing at zero when the difference therebetween is zero; a respective servoactuator means connected to each respective one of said movable means for actuating the same and to the amplifier means for receiving from the latter a respective one of the balance, sensitivity, and linearity step output voltages, each respective servoactuator means being driven, by said respective amplifier output received thereby, in a direction wherein it moves the respective movable means to which it is connected to a position in which system output signal voltage is zero in the balance correction step, equal to the sensitivity reference voltage in the sensitivity correction step, and equal to the linearity reference voltage in the linearity reference voltage in the linearity correction step.

10. In combination with a data-sensing system having airborne components producing a data signal corresponding to data sensed thereby, an airborne recorder receiving and recording the data signal on a magnetic tape, means for playing back the data signal upon transfer of the tape to the ground, and means receiving the data signal and producing in response thereto a system output signal voltage corresponding to the data signal, a correcting unit receiving the system output signal voltage and comprising: movable means connected in said means producing the system output signal voltage and positionally adjustable for correcting balance errors in said output signal voltage; movable means receiving said output signal voltage and positionally adjustable for correcting sensitivity errors in the same; movable means connected to said means producing the system output signal voltage and positionally adjustable for correcting linearity errors in said output signal voltage; means providing a sensitivity reference voltage; means providing a linearity reference voltage; amplifier means connectable to the system output signal voltage during separate balance, sensitivity, and linearity correction steps and also to a corresponding one of the reference voltage providing means during each of the sensitivity and linearity correction steps, the amplifier means producing during the balance step an output voltage related to system output signal voltage and standing at zero when the latter is zero, during the sensitivity balance step an output voltage related to the voltage difference between the system output signal voltage and the sensitivity reference voltage and standing at zero when the difference is zero, and during the linearity step an output voltage proportional to the voltage difference between the system output signal voltage and the linearity reference voltage and standing at zero when the difference therebetween is zero; a respective servoactuator means connected to each respective one of said movable means for actuating the same and to the amplifier means for receiving from the latter a respective one of the balance, sensitivity, and linearity step output voltages, each respective servoactuator means being driven, by said respective amplifier output received thereby, in a direction wherein it moves the respective movable means to which it is connected to a position in which system output signal voltage is zero in the balance correction step, equal to the sensitivity reference voltage in the sensitivity correction step, and equal to the linearity reference voltage in the linearity correction step.

11. Means in a first location for sensing values of a given quantity and generating a data signal having values representative thereof; means for generating a linearity calibration signal in said first location; means receiving the data and calibration signals from the data signal and linearity calibration signal generating means and transmitting them to a second location; receiver means in the second location receiving the transmitted data and calibration signals and producing an output having voltage values representative of values of the data and calibration signals; means providing a linearity reference signal of known value in the second location; means comparing the reference and calibration signals and producing a control signal representative of the relationship therebetween; adjustment means including at least one movable means electrically connected to the receiver output and positionally adjustable for varying the receiver output for correcting linearity errors in the same; and servoactuator means receiving and energized by the control signal for positioning the movable means whereby the receiver output is corrected for errors in linearity.

12. For use in a system for measuring data in a remote position, transferring the measured values thereof to a second position and reproducing the measured values, wherein a data signal having a range comprising a high and a low range and at least two linearity calibration signals are generated in said remote position for transmission to said second position, the combination in said second position of a signal receiving device receiving the data and calibration signals and producing in response thereto an output containing a data signal portion and at least two linearity calibration signal portions; linearity calibration signal reference means; means comparing said reference means to the values of the calibration signal portions of said output and producing at least two control signals of values in accordance with the relationship therebetween, the values of the control signals being zero when the difference between compared values of the reference means and calibration signal portions is zero; an electrical network connected with the signal receiving device and having elements connected with the receiver output, one of said elements being movable for effecting adjustment of the data signal portion for linearity only in its high range and another of said elements being movable for effecting adjustment of the data signal portion for linearity only in its low range; and motor means mechanically connected to said elements and receiving the control signals, the motor means being energized by the latter for moving said elements to respective positions in which the difference in the compared values of the reference means and calibration signal portions is zero.

13. An instrumentation system comprising a transmission unit having an end instrument which senses a given physical quantity and produces an output voltage indicative of sensed values thereof, and which unit comprises components producing in response to said sensed values of said quantity a transmitted signal consisting of equivalent proportional frequency variations; and a receiving unit receiving the transmitted signal and including: a discriminator producing an output comprising voltage variations in response to the received signal; and null balance amplifier correcting means connected to the output of said discriminator for adjusting the receiver output voltage to zero when the output voltage of said end instrument is zero, during a balance error correcting step in a calibration cycle, so that balance errors are removed from the next succeeding receiver output signal, said null balance amplifier correcting means comprising an amplifier and means for connecting the same to the distriminator output, the amplifier producing an output responsive to the discriminator output and standing at zero when the latter is zero; a servomotor controlled by the amplifier output; and a frequency determining network electrically connected into the discriminator and including an element positionally adjustable for regulation of the discriminator output, said element being mechanically connected with and positionally adjustable by the servomotor.

References Cited in the file of this patent

UNITED STATES PATENTS

| | | |
|---|---|---|
| 1,929,241 | Franklin | Oct. 3, 1933 |
| 2,039,404 | Green | May 5, 1936 |
| 2,663,855 | Beggs | Dec. 22, 1953 |
| 2,753,546 | Knowles | July 3, 1956 |
| 2,753,547 | Donath | July 3, 1956 |
| 2,820,893 | Bickford | Jan. 21, 1958 |
| 2,915,741 | Magasiny | Dec. 1, 1959 |